United States Patent [19]

Gentile

[11] Patent Number: 5,295,615
[45] Date of Patent: Mar. 22, 1994

[54] REFILLABLE PUMP DISPENSING CONTAINER

[75] Inventor: James L. Gentile, Orange, Conn.

[73] Assignee: Chesebrough-Pond's USA Co., Division of Conopco, Inc., Greenwich, Conn.

[21] Appl. No.: 954,849

[22] Filed: Sep. 30, 1992

[51] Int. Cl.$^5$ .............................................. G01F 11/04
[52] U.S. Cl. ................................ 222/327; 222/386
[58] Field of Search ................ 222/325, 326, 327, 386

[56] References Cited

U.S. PATENT DOCUMENTS

| | | | |
|---|---|---|---|
| 2,085,446 | 6/1937 | Philippe | 222/78 |
| 2,655,289 | 10/1953 | Peal | 222/162 |
| 2,661,126 | 12/1953 | Spencer | 222/386 |
| 4,205,766 | 6/1980 | White | 222/135 |
| 4,220,261 | 9/1980 | White | 222/135 |
| 4,331,267 | 5/1982 | Duncan et al. | 222/327 X |
| 4,742,940 | 5/1988 | Wilkinson | 222/162 |
| 4,819,836 | 4/1989 | Meckenstock | 222/386 |
| 4,934,570 | 6/1990 | Bamberger et al. | 222/386 |
| 5,094,496 | 3/1992 | Gayle et al. | 222/386 |

FOREIGN PATENT DOCUMENTS

| | | | |
|---|---|---|---|
| 1179386 | 10/1964 | Fed. Rep. of Germany | 222/386 |
| 2095844 | 2/1972 | France | |
| 461207 | 9/1949 | Italy | 222/326 |
| 418543 | 11/1962 | Switzerland | 222/386 |

Primary Examiner—Andres Kashnikow
Assistant Examiner—Joseph A. Kaufman
Attorney, Agent, or Firm—Milton L. Honig

[57] ABSTRACT

A dispensing container is provided for delivery of viscous flowable materials such as toothpaste. The container includes a cylindrical upper body for containing the viscous flowable material and is fitted with an orifice for allowing egress thereof. At a lower end of this body is fitted a piston sealingly slidable within the upper body. The piston is formed from a diaphragm and a skirt of circumferentially concave form surrounding the diaphragm and sealingly slideable against an inner wall of the upper body. Within the piston is a cavity downwardly open. A cylindrical lower body is received telescopically within the cylindrical upper body. A boss portion is formed on top of the lower body and extends into the piston cavity to establish a snug, frictional fit. When the container is exhausted of viscous flowable material, the upper body can be discarded and a refill of similar construction can be mounted on the reusable cylindrical lower body.

5 Claims, 4 Drawing Sheets

REFILLABLE PUMP DISPENSING CONTAINER

BACKGROUND OF THE INVENTION

1. Field of the Invention

The invention concerns a refillable pump dispensing container, especially for viscous flowable materials.

2. Related Art

Pump dispensing containers are convenient packages for delivering viscous flowable materials. Consumer products such as toothpaste have, for several years, been sold to some extent in pumps. These type of containers are, however, quite expensive. Typical of the art are those described in U.S. Pat. No. 3,268,123 (Spatz), U.S. Pat. No. 4,511,068 (Bossina) and U.S. Pat. No. 4,685,594 (Czech) which depend upon a one-way movable, spring-like diaphragm.

Environmental regulations are being considered concerning source reduction for packaging. Not only must the amount of packaging be reduced, but the type must be simplified for recycling purposes. For instance, there is a goal to form each package from a single material. Mixed plastics or plastic and metal combinations are undesirable. Even in the absence of government regulation, responsible business is interested in improving the environment.

A particular problem with commercial pumps such as described in the aforementioned patents is the necessity for a metal spring to be associated with an upward moving diaphragm. For purposes of recycling, elimination of the metal spring would be desirable.

Simple displacement pumps ordinarily do not require metal spring diaphragms; they are environmentally more friendly packages. Illustrations of such pumps are found in U.S. Pat. No. 2,085,446 (Philippe), U.S. Pat. No. 2,655,289 (Peal), U.S. Pat. No. 4,205,766 (White), U.S. Pat. No. 4,220,261 (White), U.S. Pat. No. 4,742,940 (Wilkinson) and French Patent 2,095,844 (Beecham Group Ltd.). These patents disclose pumps with an upper body containing a viscous flowable material and a lower body serving as a piston. Upon downward pressure on the upper body, the piston forces the viscous material upward and out through an orifice in the upper body.

The known displacement pumps still have one environmental problem which requires improvement. Simple displacement pumps up until now have not been refillable. Not only must the upper material-containing body but also the lower piston body be discarded upon exhaustion of the material to be dispensed. Consequently, a simple displacement pump is sought wherein the lower body could be reused thereby reducing the disposable amount of packaging.

Accordingly, it is an object of the present invention to provide a simple displacement pump capable, at least in part, of being reusable.

A further object of the present invention is to provide a simple displacement pump operable with a refill cartridge.

A still further object of the present invention is to provide a refill cartridge that can be used with a simple displacement pump.

Another object of the present invention is to provide a simple displacement pump which does not require any metal spring or metal parts.

These and other objects of the present invention will become more readily apparent from the following summary, drawings and detailed description.

SUMMARY OF THE INVENTION

A dispensing container is provided for flowable material comprising:

(a) a cylindrical upper body for containing the flowable material and having a first and second end opposite one another, the second end having an open mouth;

(b) a cylindrical lower body having a first and second end opposite one another, the first end being telescopically mounted within the upper body, and the first end having a boss portion of a smaller diameter than a cross-sectional diameter of the lower body;

(c) an orifice for allowing egress of the flowable material, the orifice being formed on the first end of the upper body; and (d) a piston sealingly slidable within the upper body, the piston being formed by a diaphragm having an upper and lower surface and a skirt surrounding the diaphragm, the piston upper surface facing the first end of the upper body, the flowable material being restricted to an area between the piston upper surface and the orifice, the piston lower surface in combination with the skirt defining a cavity and the boss portion of the lower body extending into the cavity consisting of a straight cylindrical wall along a length thereof, establishing a snug, frictional fit.

Also provided is a refill for a dispensing container comprising:

(a) a cylindrical upper body for containing the flowable material and having a first and second end opposite one another, the second end having an open mouth;

(b) an orifice for allowing egress of the flowable material, the orifice being formed on the first end of the upper body; and (c) a piston sealingly slidable within the upper body, the piston being formed by a diaphragm having an upper and lower surface and a skirt surrounding the diaphragm, the piston upper surface facing the first end of the upper body, the flowable material being restricted to an area between the piston upper surface and the orifice, and the piston lower surface in combination with the skirt defining a cavity consisting of a straight cylindrical wall along a length thereof, and a seal means across an open mouth and below the skirt at a second end of the upper body, the mouth being completely closed by the seal means.

BRIEF DESCRIPTION OF THE DRAWINGS

The foregoing objects, features and advantages of the present invention will more fully be understood by consideration of the drawing describing an embodiment thereof in which.

DETAILED DESCRIPTION

Figure 1A:
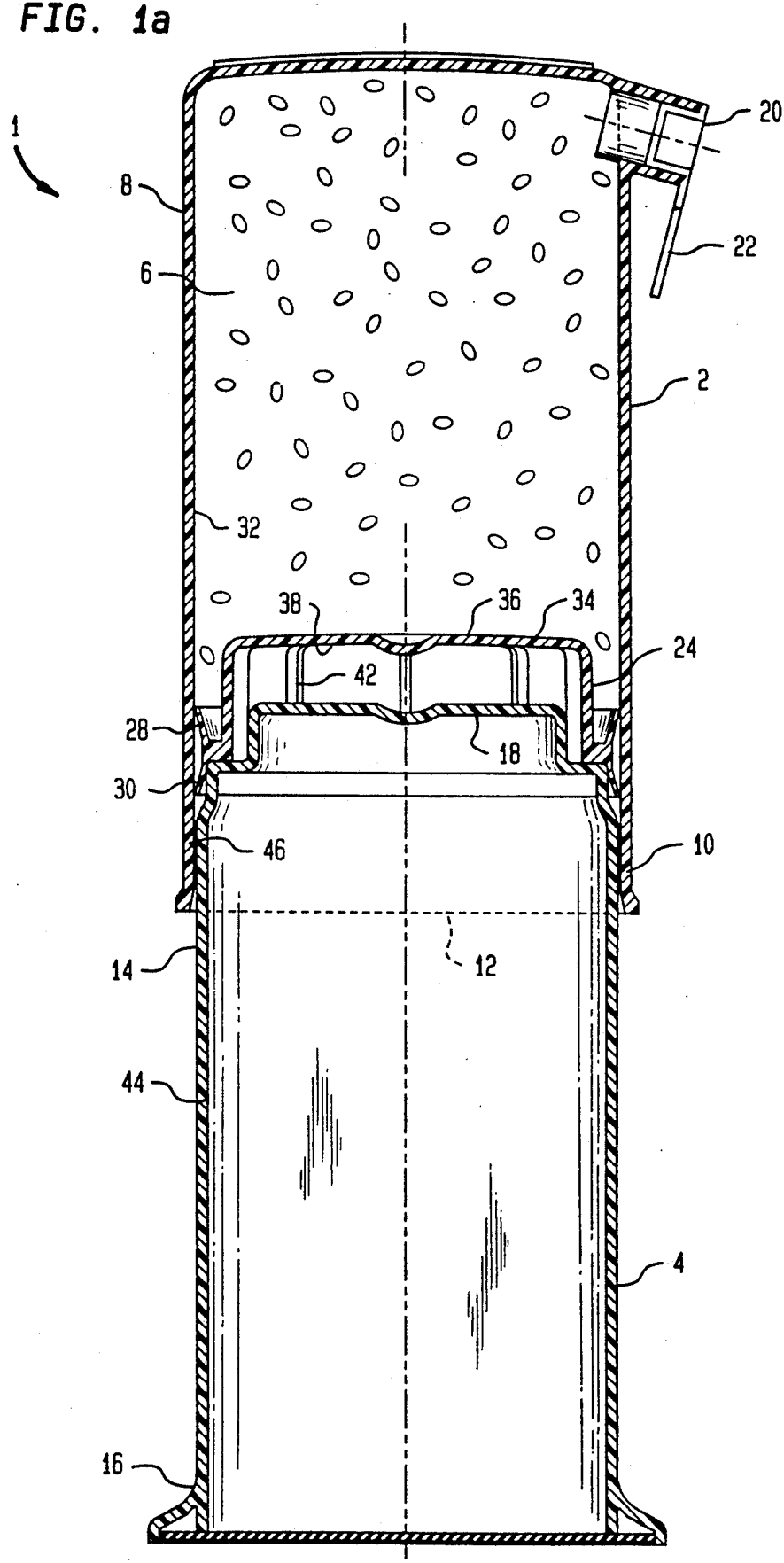
FIG. 1a is a cross-sectional plan view through the pump dispenser of the present invention, in filled form.

According to a preferred embodiment of the invention, the dispenser 1 includes a cylindrical upper body 2 and a cylindrical lower body 4. By the term "cylindrical" is meant either a round or oval cross-sectional shape. Within the cylindrical upper body is a viscous flowable material 6. This flowable material rests between a first end 8 and a second end 10 of the upper body. Mouth 12 is an opening at the second end 10 of the upper body.

The cylindrical lower body 4 also has a first end 14 and a second end 16 opposite one another. First end 14 is telescopically mounted within the upper body.

First end 14 of the lower body will normally be a closed-off end. Upwardly projecting from first end 14 is a boss portion 18 which has a smaller diameter than a cross-sectional diameter of the lower body 4.

Figure 1B:
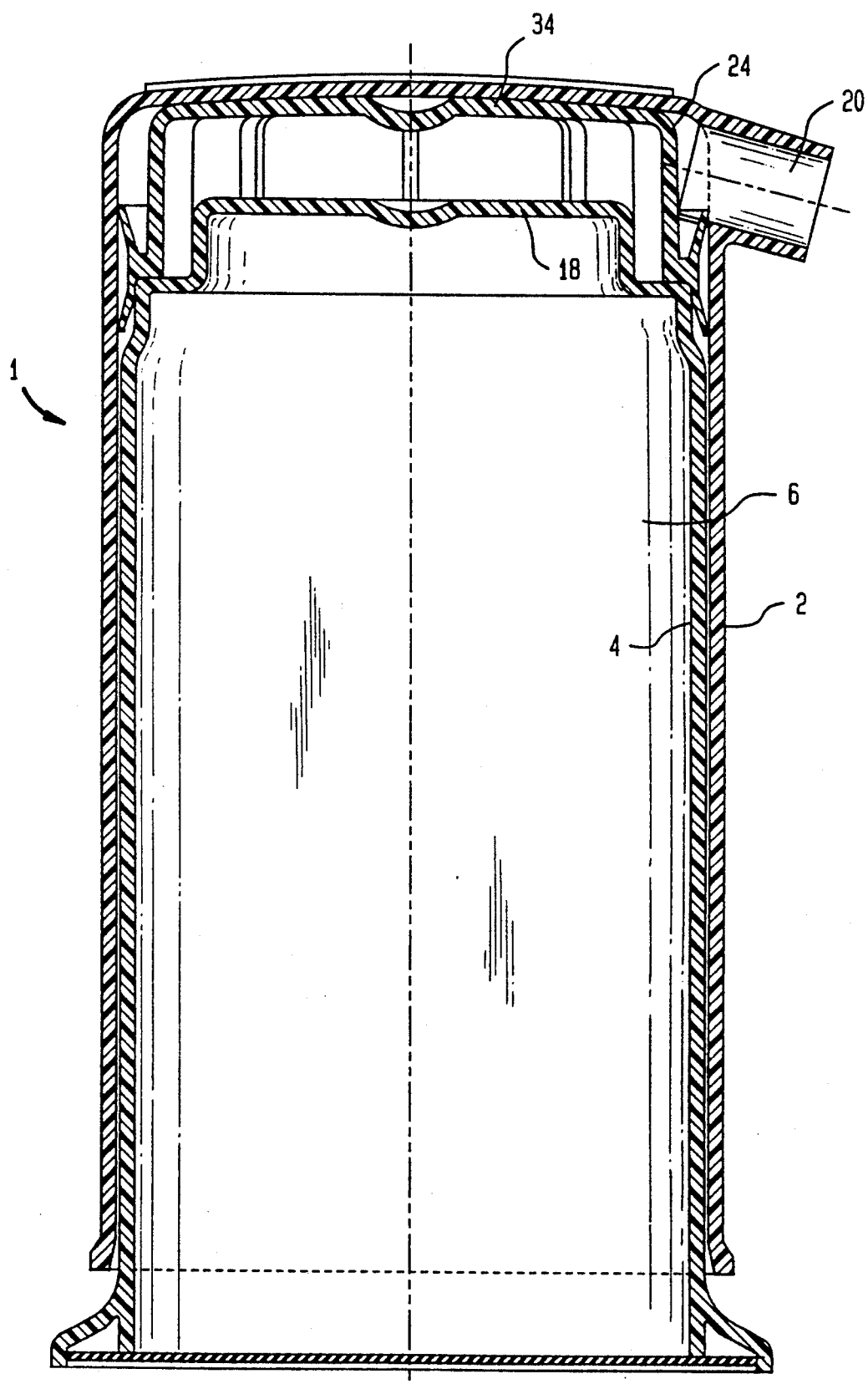
FIG. 1b is a cross-sectional plan view of the pump dispenser of the present invention, subsequent to complete dispensing of the flowable material.

An orifice 20 is formed at the first end 8 of the upper body. This orifice allows egress of the viscous flowable material. As shown in FIG. 1a and 1b, the orifice is integrally molded onto upper body 2. Alternatively the orifice may be formed as a separate element. For instance, the orifice may be a snap-on spout or a combined spout/flip top cap.

Swingably attached to a mouth of the orifice is a plug 22 for preventing unwanted egress when the dispenser is in a storage mode. Closures other than a plug may also be suitable; these could include a snap-on cap, retractable finger or even a tape.

Figure 2:
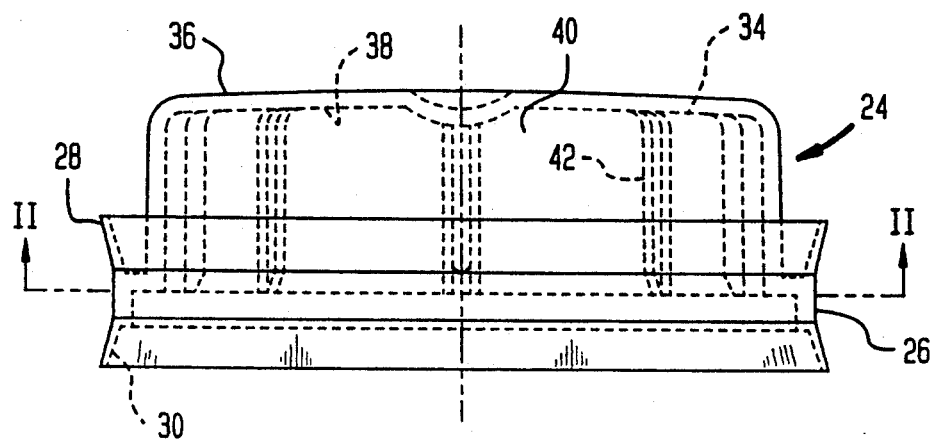
FIG. 2 is a view, in partial phantom line of interior features, of the plunger.

A piston 24 is lodged within the upper body 8 at a second end 10 thereof. Surrounding the piston 24 and integrally formed therewith is a skirt 26 as best shown in FIG. 2. The skirt 26 along its circumferential periphery is concave-shaped with upper and lower margins 28 and 30. Piston 24 is lodged sealingly slidable within the upper body 2. Maintenance of the seal occurs through a circumferentially tight contact of the upper and lower margins 28 and 30 against an inner wall of the cylindrical upper body 2. Piston 24 is further formed by a diaphragm 34, the latter having an upper and a lower surface 36 and 38, respectively. A cavity 40 is formed in an area bounded by the diaphragm lower surface 38 having a C-shape.

Figure 3:
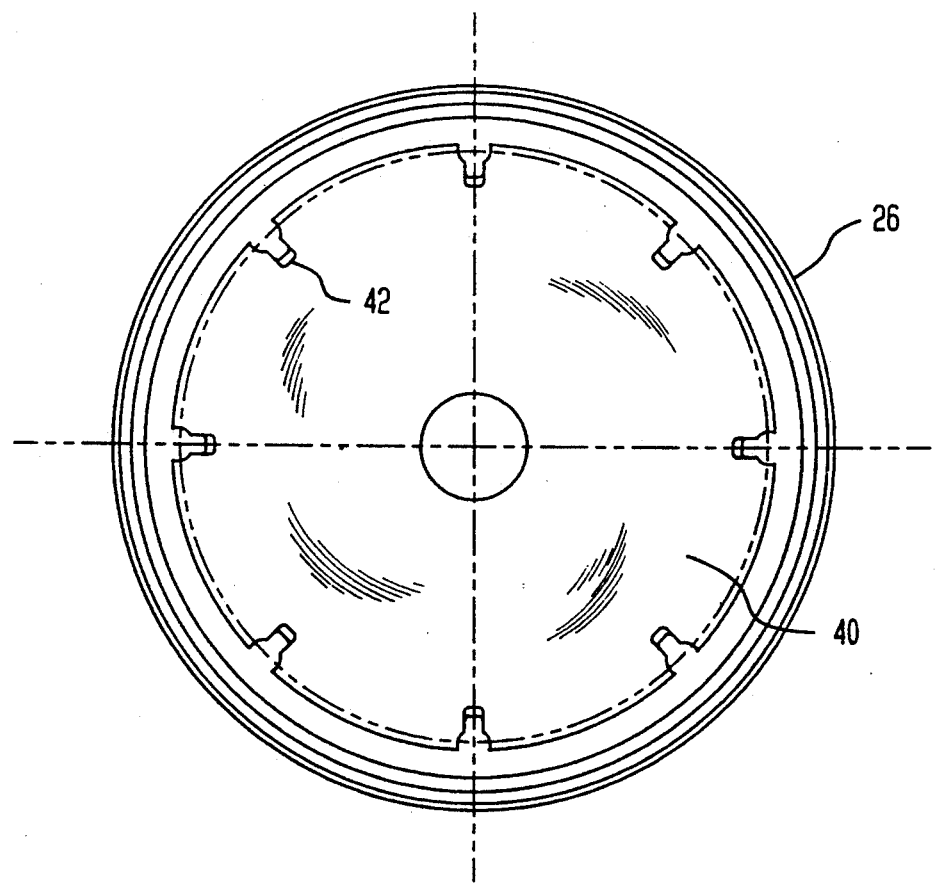
FIG. 3 is a cross-sectional view of the plunger along line II—II.

FIG. 3 illustrates a plurality of ribs 42 formed along an inner wall of diaphragm 36 projecting a short distance radially inward toward a center of cavity 40. Ends of these ribs contact boss portion 18 around a circumferential periphery thereof to achieve the snug frictional fit. Alternatively, the plurality of ribs 42 can be formed along an outer wall of the boss portion 18. In this arrangement, the ribs will project radially outwardly to contact the inner wall of diaphragm 36 thereby achieving the snug frictional fit.

Dispenser 1 functions in a manner illustrated by FIG. 1a and 1b. When charged with product as in FIG. 1a, a user will press downward on a top outer surface of cylindrical upper body 2. This downward pressure results in the sealingly sliding upward movement of piston 24 along an inner surface of the cylindrical upper body 2. Viscous flowable material is then forced outward through orifice 20. Illustrative viscous flowable materials include toothpaste, shaving cream, skin lotions, suntanners, sunscreens and related products. Once the upper surface 36 of diaphragm 34 has reached a roof area within the cylindrical upper body 2, further expression of the viscous flowable material will cease.

An important aspect of the present invention is the adaptability to provide a refill for dispenser 1. To accomplish this, lower body 4 in FIG. 1b is disengaged from upper body 2. Disengagement is rendered possible by the nonsealing but telescopically slidable relationship between an outer wall 44 of the lower body and inner wall 46 of the upper body. Additionally, the snug frictional fit of boss portion 18 is designed to be readily disengageable by hand when cylindrical upper and lower bodies are pulled in opposite directions. The used cylindrical upper body 2 of FIG. 1b is intended to be discarded, preferably for recycling. Cylindrical lower body 4 can be reused to function with a refill upper body.

Figure 4:
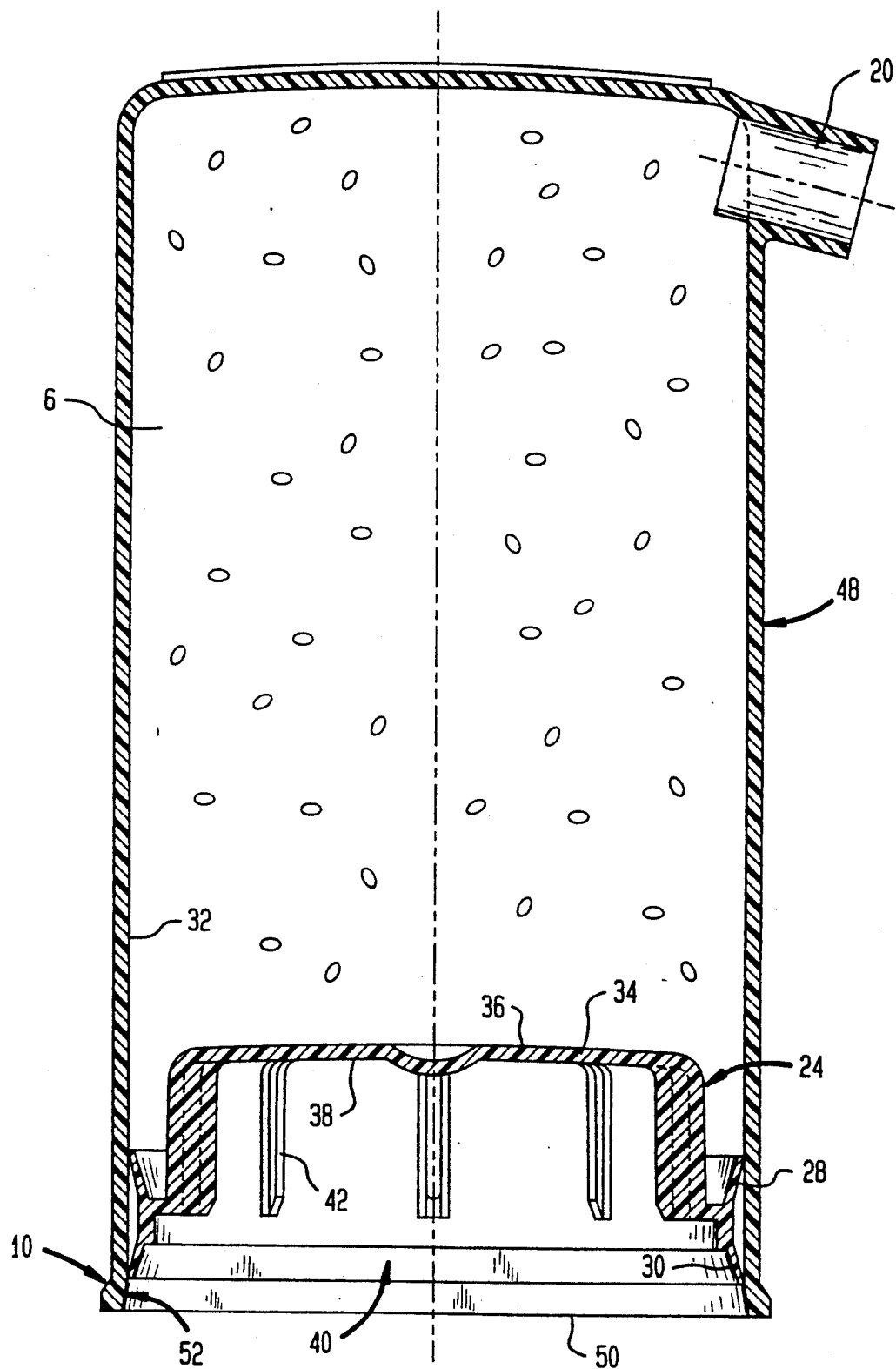
FIG. 4 is a cross-sectional plan view of a refillable upper body according to the present invention.

FIG. 4 illustrates a refill upper body 48. Reference numerals are identical to those in FIG. 1a-1b. The main difference is that refill upper body 48 is not provided with its own cylindrical lower body. Furthermore, a cylindrical foil 50 is positioned as a seal across a mouth 52 defining an opening at the second end 10 of upper body 2. Cylindrical foil 50 will have a cross section substantially identical to that of mouth 52. Sealing means other than foil 50 may also be utilized. For instance, a cap or plug may be placed across mouth 52 to cover same. Upon use, foil 50 or the like will be removed and the refill upper body 48 will be placed telescopically over the cylindrical lower body 4. Bodies 2 and 4 will then be pressed together so as to insure engagement of boss portion 18 to snugly fit within cavity 40.

Only a select embodiment of the invention has hereinabove been described. It is to be understood that the invention is capable of other variations and combinations which are considered to be within the scope and purview of this invention.

What is claimed is:

1. A dispensing container for flowable material comprising:
   (a) a cylindrical upper body for containing the flowable material and having a first and second end opposite one another, the second end having an open mouth;
   (b) a cylindrical lower body having a first and second end opposite one another, the first end being telescopically mounted within the upper body, and the first end having a boss portion of a smaller diameter than a cross-sectional diameter of the lower body;
   (c) an orifice for allowing egress of the flowable material, the orifice being formed on the first end of the upper body; and
   (d) a piston sealingly slidable within the upper body, the piston being formed by a diaphragm having an upper and lower surface and a skirt surrounding the diaphragm, the upper surface facing the first end of the upper body, the flowable material being restricted to an area between the upper surface and the orifice, the lower surface in combination with the skirt defining a cavity consisting of a straight cylindrical wall along a length thereof, the boss portion of the lower body extending into the cavity, the cylindrical wall being formed with a plurality of ribs on an inner surface thereof projecting radially inward in a direction perpendicular to the lower surface of the diaphragm and frictionally engaging the boss portion of the lower body to establish a snug, frictional fit, 2. A container according to claim 1 wherein the skirt along a circumference thereof has a concave shape.

3. A container according to claim 2 wherein upper and lower margins of the concave skirt contact an inner surface of the cylindrical upper body.

4. A container according to claim 1 wherein the cylindrical upper body has a cross-sectional shape selected from the group consisting of round and oval configurations.

5. A dispensing container for flowable material comprising:
   (a) a cylindrical upper body for containing the flowable material and having a first and second end opposite one another, the second end having an open mouth;
   (b) a cylindrical lower body having a first and second end opposite one another, the first end being telescopically mounted within the upper body, and the first end having a boss portion of a smaller diameter than a cross-sectional diameter of the lower body;
   (c) an orifice for allowing egress of the flowable material, the orifice being formed on the first end of the upper body; and
   (d) a piston sealingly slidable within the upper body, the piston being formed by a diaphragm having an upper and lower surface and a skirt surrounding the diaphragm, the upper surface facing the first end of the upper body, the flowable material being restricted to an area between the upper surface and the orifice, the lower surface in combination with the skirt defining a cavity consisting of a straight cylindrical wall along a length thereof, the boss portion of the lower body extending into the cavity, the boss being formed with a plurality of ribs along an outer wall thereof projecting radially outward in a direction perpendicular to the lower surface of the diaphragm and frictionally engaging the cylindrical wall of the cavity to establish a snug, frictional fit.

* * * * *